United States Patent

Okuhara et al.

[11] Patent Number: 5,645,441
[45] Date of Patent: Jul. 8, 1997

[54] ROTARY CONNECTOR DEVICE

[75] Inventors: Takeshi Okuhara; Tsuyoshi Matsumoto; Takashi Sakamaki, all of Omorinishi, Japan

[73] Assignee: Niles Parts Co., Ltd., Japan

[21] Appl. No.: 444,040

[22] Filed: May 18, 1995

[51] Int. Cl.[6] .................................................. H01R 35/04
[52] U.S. Cl. ................................... 439/164; 439/885
[58] Field of Search ........................... 439/164, 15, 885, 439/606

[56] References Cited

U.S. PATENT DOCUMENTS

| | | | |
|---|---|---|---|
| 4,865,562 | 9/1989 | Burg et al. | 439/885 |
| 4,978,307 | 12/1990 | Billman et al. | 439/885 |
| 5,060,372 | 10/1991 | Capp et al. | 439/885 |
| 5,230,713 | 7/1993 | Schauer | 439/164 |

FOREIGN PATENT DOCUMENTS

| | | |
|---|---|---|
| 62-11147 | 3/1987 | Japan. |
| 6421988 | 2/1989 | Japan. |

*Primary Examiner*—Gary F. Paumen
*Attorney, Agent, or Firm*—Ronald P. Kananen

[57] ABSTRACT

This invention provides a rotary connector device which can form a structural portion for fixing an end portion of a flexible cable to a housing by one molding step, and does not require a press mold for separating partially-connected terminals into individual terminal elements. The flexible cable 3 is accommodated spirally in a space defined between a stator housing and a rotor housing. A terminal 4A is electrically connected to a conductor cable 31 exposed from the flexible cable 3. A support 5A is fixed to at least one of the stator housing and the rotor housing. A terminal 4A has a stress concentration portion 41A, and each terminal plate 42A can be separated by bending and removing each connecting plate 43A.

4 Claims, 10 Drawing Sheets

ROTARY CONNECTOR DEVICE

BACKGROUND OF THE INVENTION

1. Field of the Invention

This invention relates to an improvement in a rotary connector device for supplying power to an air bag disposed at a pad portion of the steering wheel of an automobile, for example, and particularly to a technique for simplifying the step of molding a structural portion for fixing an end portion of a flexible cable to a housing while reducing the cost of the structural portion.

The present invention specifically relates also to a technique for improving a flexible tongue disposed along a flexible cable so as to prevent buckling of this flexible cable in a structural portion for fixing an end portion of the flexible cable to a housing.

2. Description of the Related Art

One of the techniques of this kind is disclosed in Japanese Utility Model Laid-Open No. 21988/1989, for example.

In the prior art, a molding process comprises a first step of forming partially connected terminals on a press, a second step of insert-molding the terminal by a primary mold, a third step of cutting the partially connected portions of the terminal so as to separate it into individual terminal elements, a fourth step of electrically connecting a conductor cable exposed from a flexible cable to terminal elements, and a fifth step of insert-molding the primary mold portion as well as the entire connection portion of the terminal by a secondary mold.

A technique of so disposing a flexible tongue as to extend along a flexible cable is known as means for preventing buckling of the end portion of the flexible cable. For example, Japanese Utility Model Publication No. 11147/1987 discloses the flexible tongue of this kind as a buckling prevention member.

SUMMARY OF THE INVENTION

The technique according to the prior art described above involves the problem that at least two molding steps are necessary and hence, the production cost is high. When the partially connected terminals are separated into individual terminals, a high level of cutting accuracy is required if the spacing between the terminals is small, and because an edge width of a press mold is small, too, durability of the mold drops.

To solve these problems, the present invention is directed to provide a rotary connector device which can form a structural portion for fixing an end portion of a flexible cable by one molding step, and which does not require a press mold for separating partially connected terminals.

To accomplish these objects, the present invention provides the following means.

A rotary connector device including a stator housing, a rotor housing fitted rotatably to the stator housing, a flexible cable spirally accommodated in a space defined by both housings, terminals electrically connected to conductor cables exposed from the flexible cable and supports for resin-molding the terminals, fixed to at least one of the stator housing and the rotor housing, wherein the terminals have stress concentration portions and can be bent and cut at the stress concentration portions.

According to one aspect of the present invention, the terminal described above comprises a plurality of terminal elements and connecting plates connecting the terminal elements with one another, and the stress concentrations are formed between the connecting plates and the terminal elements.

According to another aspect of the present invention, the connecting plates and the stress concentration portions protrude from the walls of the supports, and the connecting plates are bent and removed from the supports at the stress concentration portions.

According to still another aspect of the present invention, the stress concentration portions described above comprise a substantially linear arrangement of cuts.

In the prior art devices, if the elastic tongue a is assembled in a slightly eccentric state to the support b due to a deviation from the tolerance of assembly as shown in FIG. 15, for example, the elastic tongue a and the flexible cable (not shown) are likely to come into strong contact with the inner wall c of the housing. Accordingly, when the rotary connector device rotates, noise occurs due to the interference between the elastic tongue a and the inner wall c of the housing, and furthermore, durability drops.

The present invention solves the problem described above, too. In other words, rigidity of the elastic tongue in the transverse direction is partially reduced so as to impart flexibility against the stress acting on the elastic tongue in its transverse direction, and even when the elastic tongue and the flexible cable come into contact with the inner wall of the housing due to a deviation from the assembly tolerance, they do not come into strong contact.

To accomplish the objects described above, the present invention provides the following means.

A rotary connector device including a stator housing, a rotor housing fitted rotatably to the stator housing, a flexible cable accommodated spirally in a space defined between the housings, terminals electrically connected to conductor cables exposed from the flexible cable, supports for resin-molding the terminals, fixed to at least one of the stator housing and the rotor housing, and an elastic tongue fixed to the support and so disposed as to extend along the flexible cable, wherein rigidity of the elastic tongue in the transverse direction is partially reduced.

According to another embodiment of the invention described above, the width of the elastic tongue on the fitting side to the supports is relatively reduced to a smaller width than the width on the opposed side.

According to still another embodiment of the invention described above, the elastic tongue has a plurality of holes, and the supports have a plurality of pins fitting to the supports.

According to still another embodiment of the invention described above, at least two of the pins are used as positioning pins when the elastic tongue is assembled to the supports.

According to still another embodiment of the invention described above, the elastic tongue is fixed to the supports by caulking at least one of the poles.

DESCRIPTION OF THE PREFERRED EMBODIMENTS

Figure 1:
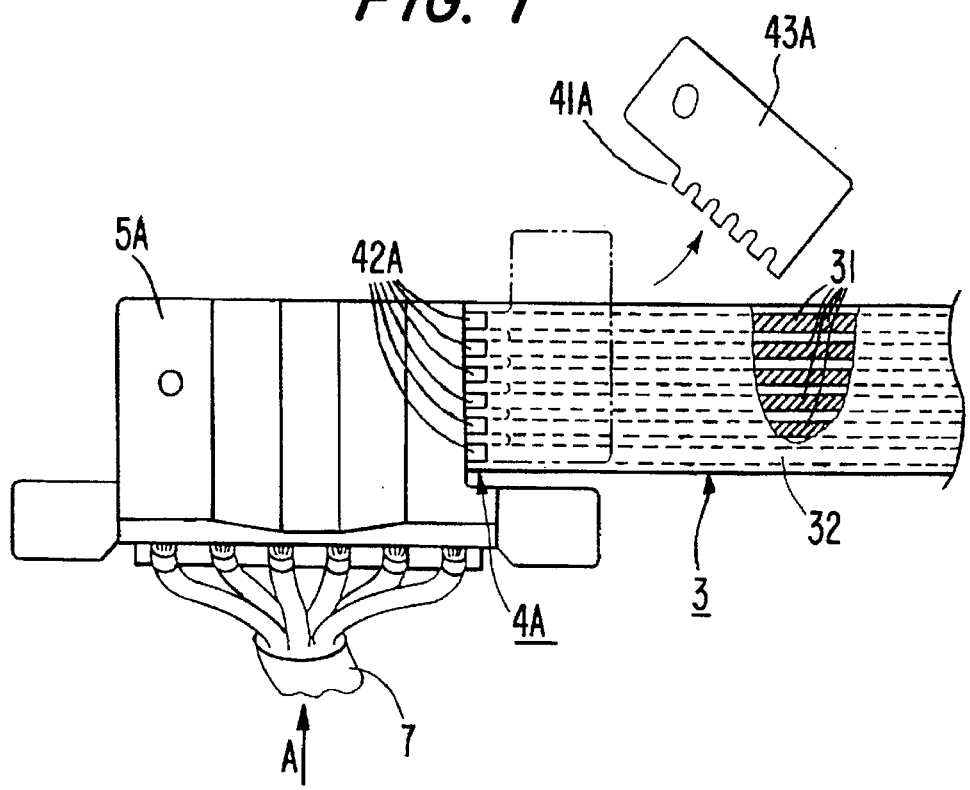
FIG. 1 is a plan view showing a preferred embodiment of the present invention.

FIGS. 1 to 8 show the first embodiment of the present invention.

In the drawings, reference numeral 1 denotes a stator housing, reference numeral 2 denotes a rotor housing, reference numeral 3 denotes a flexible cable, reference numerals 4A and 4B denote terminals, reference numerals 5A and 5B denote supports and reference numeral 6 denotes a connecting pin. These members will be explained in detail next.

First, the stator housing 1 is fixed to a combination switch of an automobile, for example, and the rotor housing 2 is rotatably fitted to the stator housing 1 and is connected to a steering wheel (not shown) by the connecting pin 6.

A flat cable, having parallel conductors 31 molded into a resin film 32, is used for the flexible cable 3. This flexible cable 3 is accommodated in a doughnut-shaped space defined between the stator housing 1 and the rotor housing 2. One end of the flexible cable is fixed to the stator housing 1 and the other to the rotor housing 2.

Figure 5:
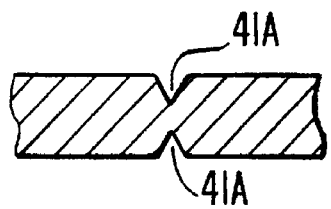
FIG. 5 is an enlarged sectional view of a C portion shown in FIG. 4.

The terminals 4A and 4B are made of a metallic material such as copper. First, the terminal 4A includes a plurality of terminal elements 42A and connecting plates 43A, 43A' interconnecting these terminal elements 42A as shown in FIGS. 3 to 6. Stress concentration portions 41A, 41A' are defined between the connecting plates 43A, 43A' and the terminal elements 42A, respectively. The stress concentration portions 41A, 41A' are aligned substantially on a line, and comprise V-grooves as shown in FIG. 5.

Figure 6:
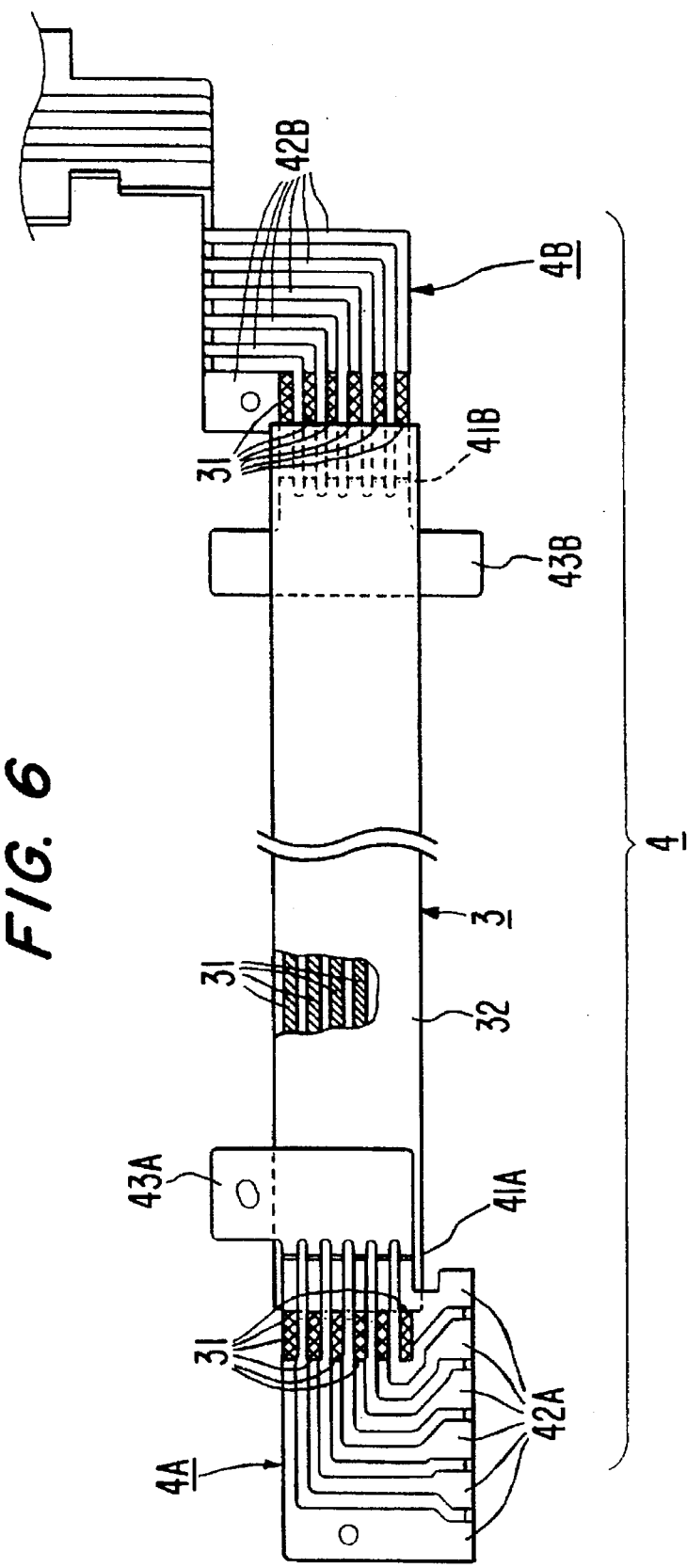
FIG. 6 is a plan view showing the terminal to which flexible cables are connected in FIG. 3.

Similarly, the terminal 4B includes a plurality of terminal elements 42B and connecting plates 43B for interconnecting these terminal elements 42B as shown in FIG. 6, and stress concentration portions 41B are defined between the connecting plates 43B and the terminal elements 42B, respectively. The stress concentration portions 41B are aligned substantially on a line, and comprise V-grooves.

The supports 5A and 5B are used for resin-molding the terminals 4A and 4B, respectively. One support 5A is fixed to the rotor housing 2, and the other to the stator housing 1. Incidentally, the support 5A is constituted as a junction member for electrically connecting the flexible cable 3 to an external harness 7, and the other support 5B is a connector for direct insertion.

Next, a series of process steps from the step of press-forming the terminals 4A, 4B to the step of removing the connecting plates 43A, 43A' and 43B will be explained.

(1) Press step:

The terminals 4A, 4B are press-formed using a mold. The stress concentrations 41A, 41A' and 41B are simultaneously formed at this process step.

(2) Connecting step:

The conductor cables 31 exposed from the flexible cable 3 are electrically connected to the terminal elements 42A, 42B by suitable connection means such as ultrasonic bonding, electrical welding or soldering. The connection portions are cross-hatched in FIG. 6.

Figure 2:
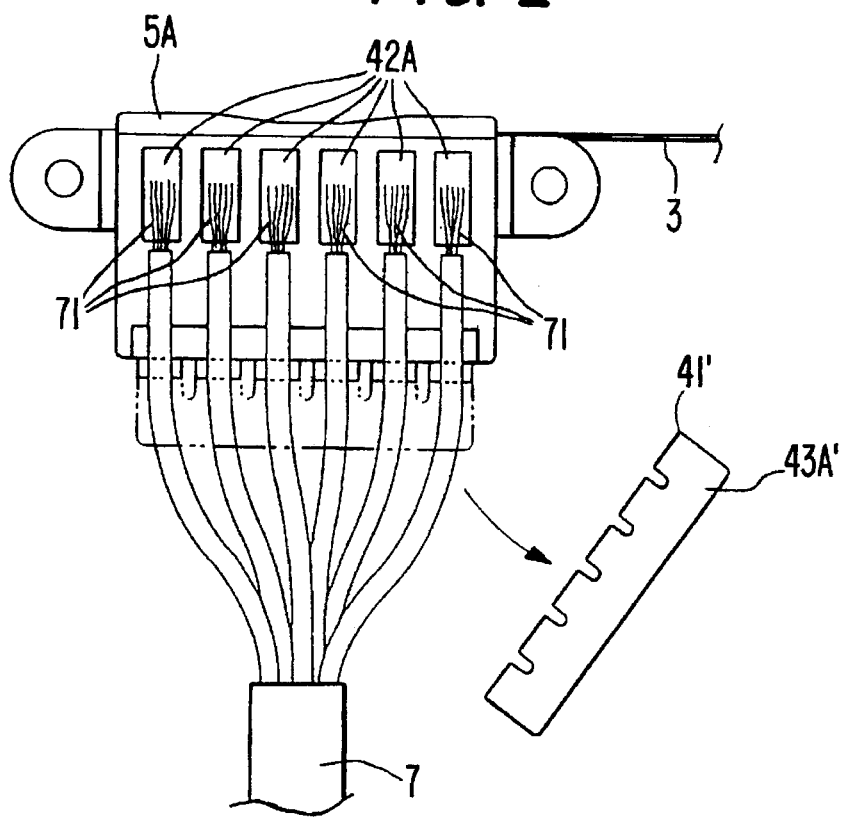
FIG. 2 is a side view as viewed in a direction of an arrow A in FIG. 1.
Figure 3:
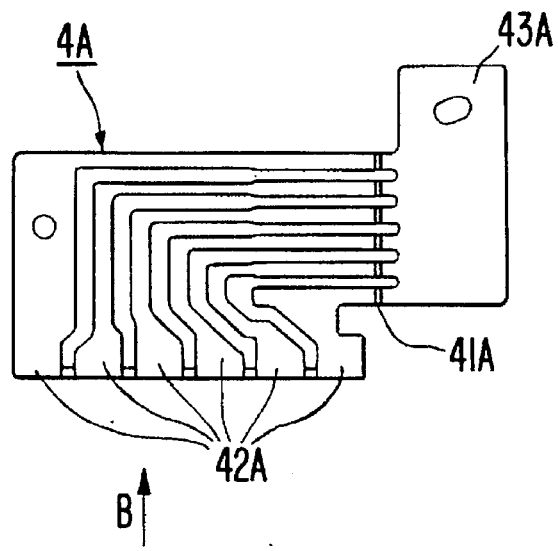
FIG. 3 is a plan view showing a terminal molded in a support shown in FIG. 1.
Figure 4:
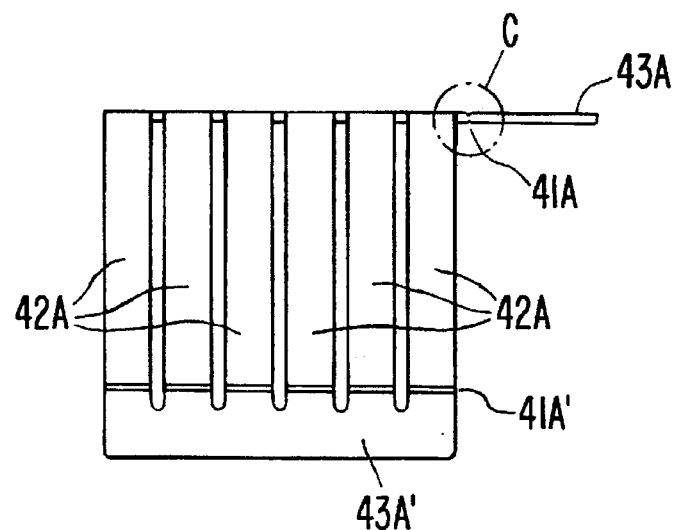
FIG. 4 is a side view as viewed in a direction of an arrow B in FIG. 3.

(3) Molding step:

Consecutively, the terminals 4A and 4B are insert-molded using an injection molding machine as shown in FIGS. 1 and 2 to form the supports 5A and 5B.

(4) Cutting step:

Next, the connecting portions 43A, 43A' and 43B of the terminals 4A, 4B protruding from the walls of the supports 5A, 5B are pinched by fingers and are bent one or more times. Then, the terminals 4A, 4B undergo metal fatigue at the stress concentration portions 41A, 41A' and 41B and are cut off. The connecting plates 43A, 43A' and 43B so cut are removed from the supports 5A, 5B. Then, a core cable 71 of the external harness 7 is connected to each terminal 42A exposed from the support 5A by suitable connection means such as ultrasonic bonding, electrical welding or soldering.

The rotary connector device having the construction described above operates in the following way.

The external harness 7 of the rotary connector device is connected to an air bag (not shown), on the steering wheel side, and the support 5B is connected to an air bag controller (not shown) on the car body side, for example. If a car crushes, for example, an electrical signal from the air bag controller is transmitted to the air bag of the steering pad through the flexible cable 3 of the rotary connector device and ignites an inflator to inflate the air bag.

FIGS. 9 to 12 show the second preferred embodiment of the present invention.

In the drawings, reference numerals 1 to 4 denote the stator housing, the rotor housing, the flexible cable and the terminal, respectively, and reference numerals 5A and 5B denote the supports. Reference numerals 6, 7 and 8 denote the connecting pin, the external harness and the elastic tongue, respectively. All of these members will be explained next in detail.

First, the stator housing 1 is fixed to a combination switch of an automobile, for example. The rotor housing 2 is rotatably fixed to the stator housing, and is connected to a steering wheel (not shown) by the connecting pin 6.

The flat cable, having parallel conductors 31 molded into a resin film, is used for the flexible cable 3. The flexible cable 3 is accommodated in the doughnut-shaped space defined between the stator housing 1 and the rotor housing 2. One end of the flexible cable 3 is fixed to the stator housing and the other to the rotor housing 2.

The terminal 4 is made of a metallic material such as copper.

The terminal 4 includes a plurality of terminal elements, and after molded to the supports 5A, 5B, the connecting plates (not shown) interconnecting these terminal elements are cut off.

Figure 7:
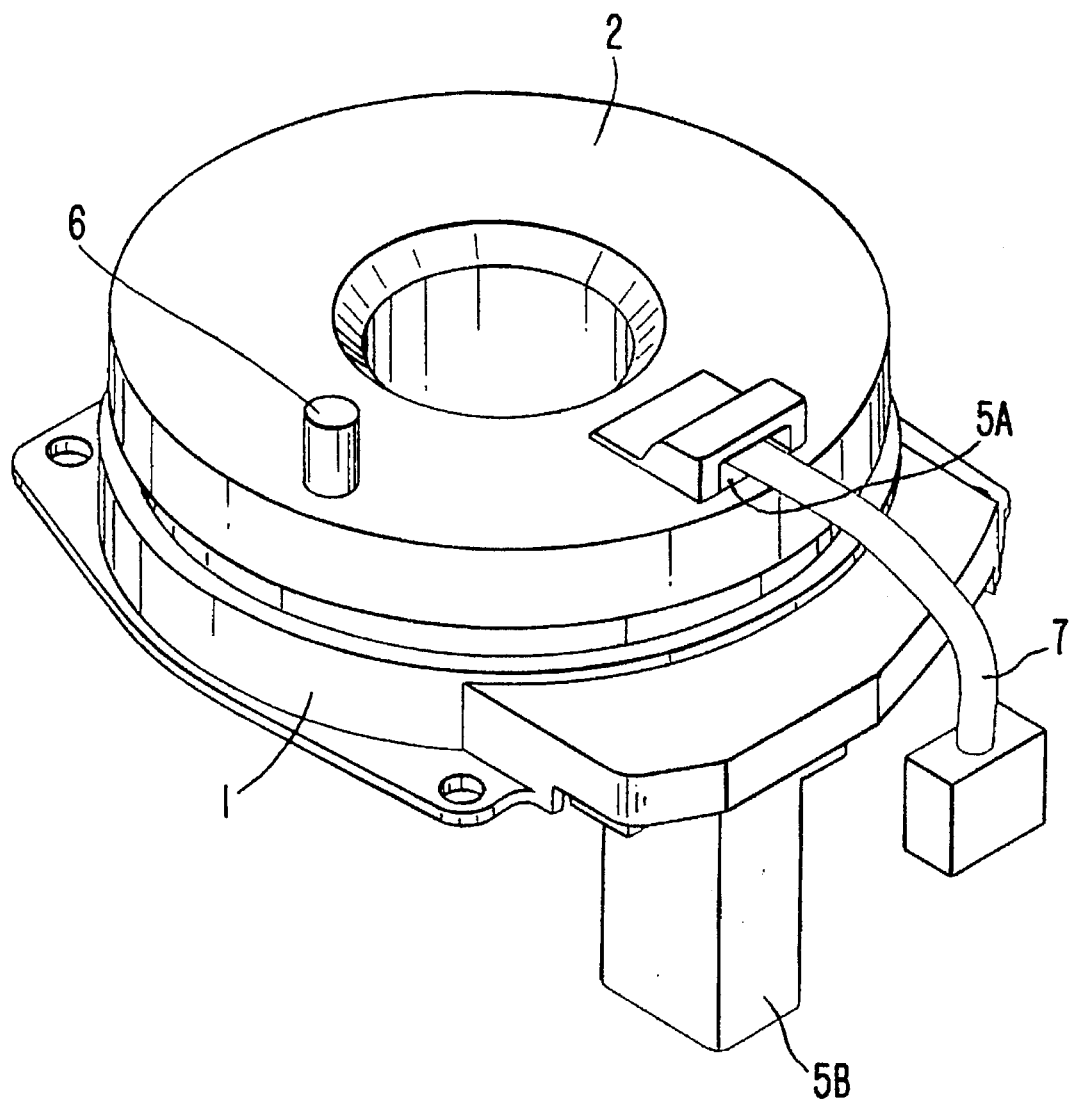
FIG. 7 is a perspective view of a rotary connector device incorporating the device shown in FIG. 1.
Figure 8:
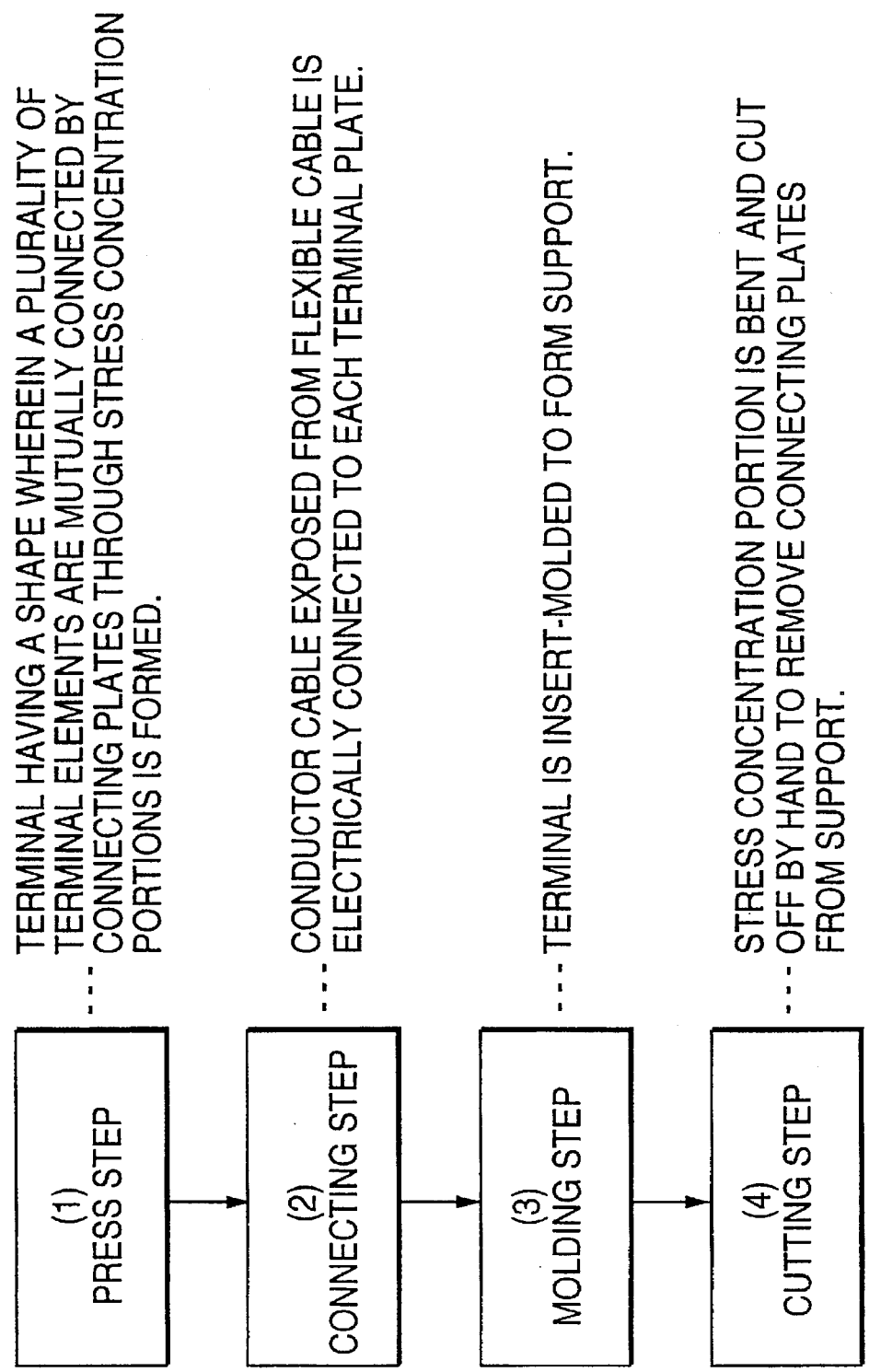
FIG. 8 is a process diagram useful for explaining the production steps of the device shown in FIG. 1.

The supports 5A, 5B are used for resin-molding the terminal 4. As shown in FIG. 7, one support 5A is constituted as a junction member for electrically connecting the flexible cable 3 to the external harness 7 and the other support 5B is a connector for direct insertion.

Figure 9:
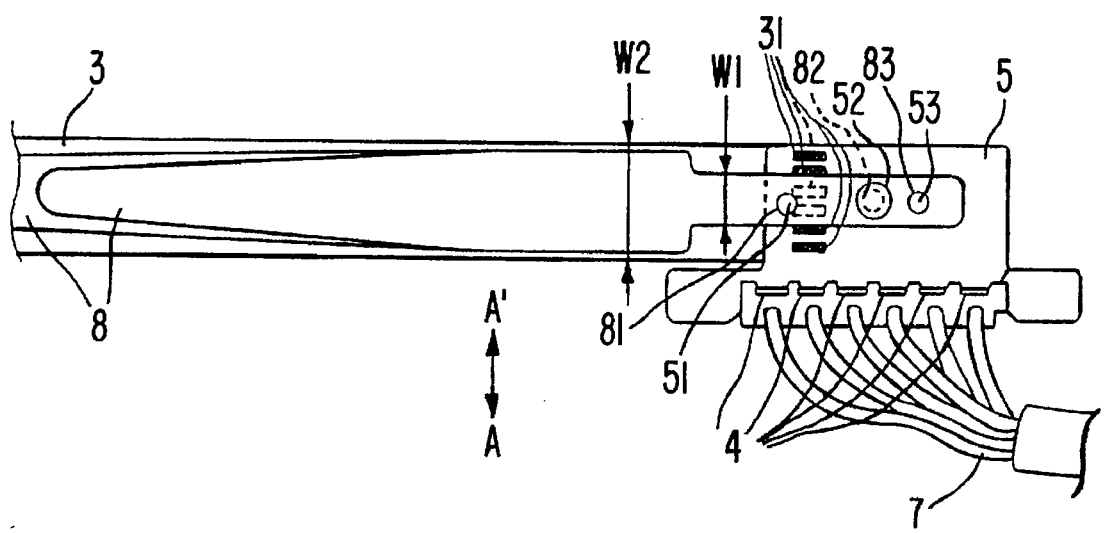
FIG. 9 is a front view showing another preferred embodiment of the present invention.
Figure 10:
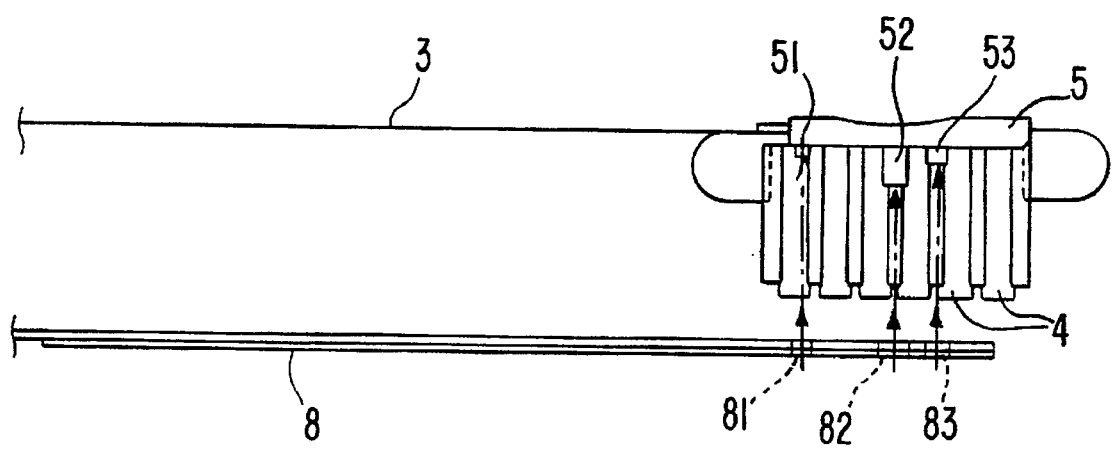
FIG. 10 is a top view showing the state where an elastic tongue of FIG. 1 is not yet assembled.

As shown in FIGS. 9 and 10, one support 5A includes three pins 51, 52 and 53. Incidentally, the pins 51 and 53 are constituted as positioning members for assembling the elastic tongue 8 to the support 5A. The remaining pole 52 is used for fixing the elastic tongue 8 to the support 5A by hot caulking.

The elastic tongue 8 is extended along the flexible cable 3 so as to prevent buckling of the end portion of the flexible cable 3 fitted to the support 5A. More concretely, the elastic tongue 8 is bonded to the flexible cable 3.

The elastic tongue 8 comprises long and short plates 81 and 82. As shown in FIG. 9, the width W1 of the side fitted to the support 5A is relatively smaller than the width W2 on the opposed side in order to reduce the rigidity in the transverse direction (the direction indicated by arrows A, A' in FIG. 9) at the portion of the width W1. In this way, flexibility is imparted against the stress acting on the elastic tongue in the transverse direction, and even if the flexible cable 3 comes into touch with the inner walls of the housings 1, 2 due to a deviation from the tolerance of assembly, it does not come into strong contact with the latter.

Figure 11:
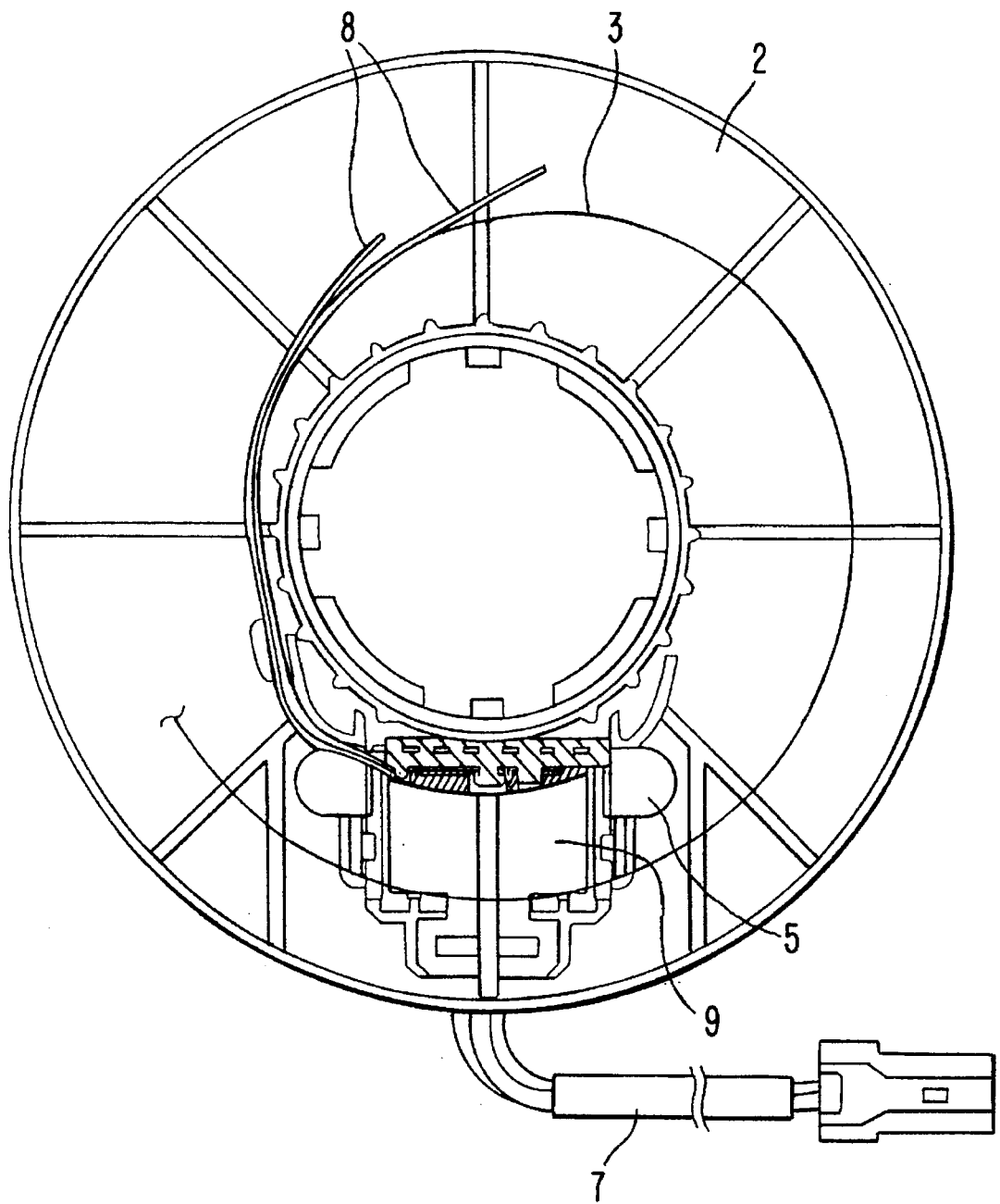
FIG. 11 is a plan view showing a rotary housing to which the device shown in FIG. 1 is assembled.
Figure 12:
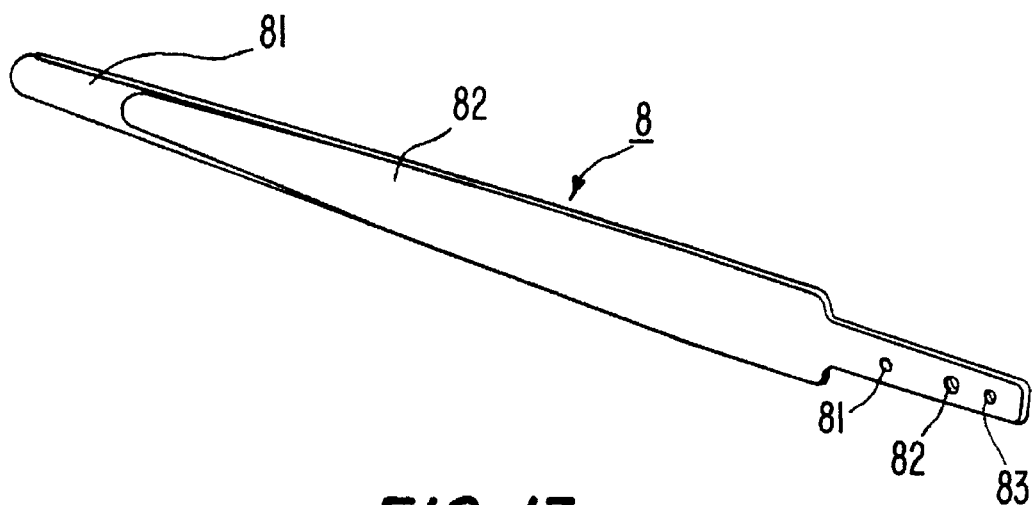
FIG. 12 is a perspective view of the elastic tongue shown in FIG. 1.

Reference numeral 9 in FIG. 11 denotes a cover, which prevents the flexible cable 3 from contact with the support 5A so that it can slide smoothly.

The rotary connector device having the construction described above operates in the following way.

The external harness 7 of the rotary connector device is connected to an air bag (not shown) on the steering wheel side and the other support 5B is connected to an air bag controller (not shown) on the car body side, for example. If a car crushes, for example, the electrical signal from the air bag controller is transmitted to the air bag apparatus of the steering pad through the flexible cable 3 of the rotary connector device, and ignites an inflator to inflates the air bag.

Figure 13:
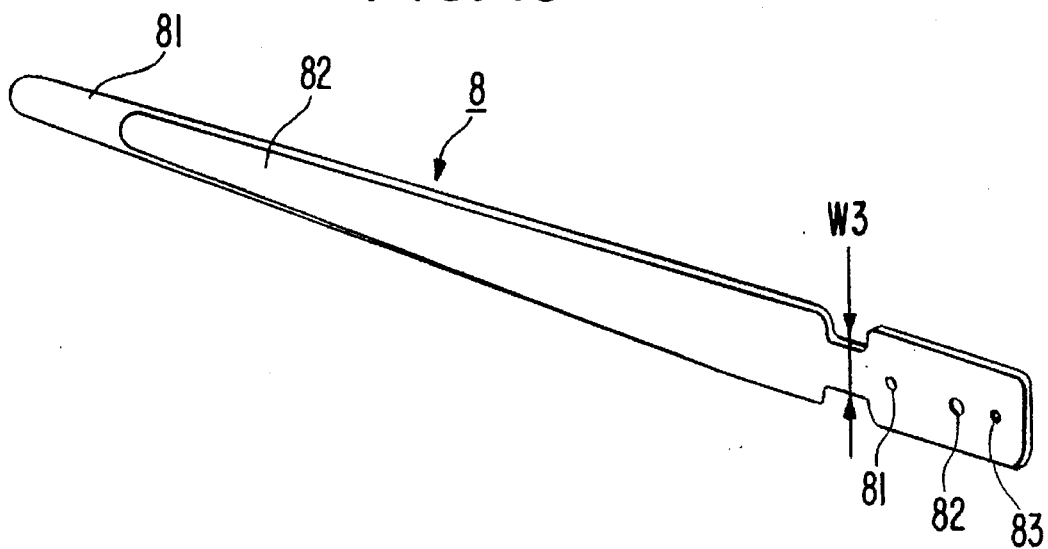
FIG. 13 is a perspective view showing still another embodiment of the present invention.
Figure 14:
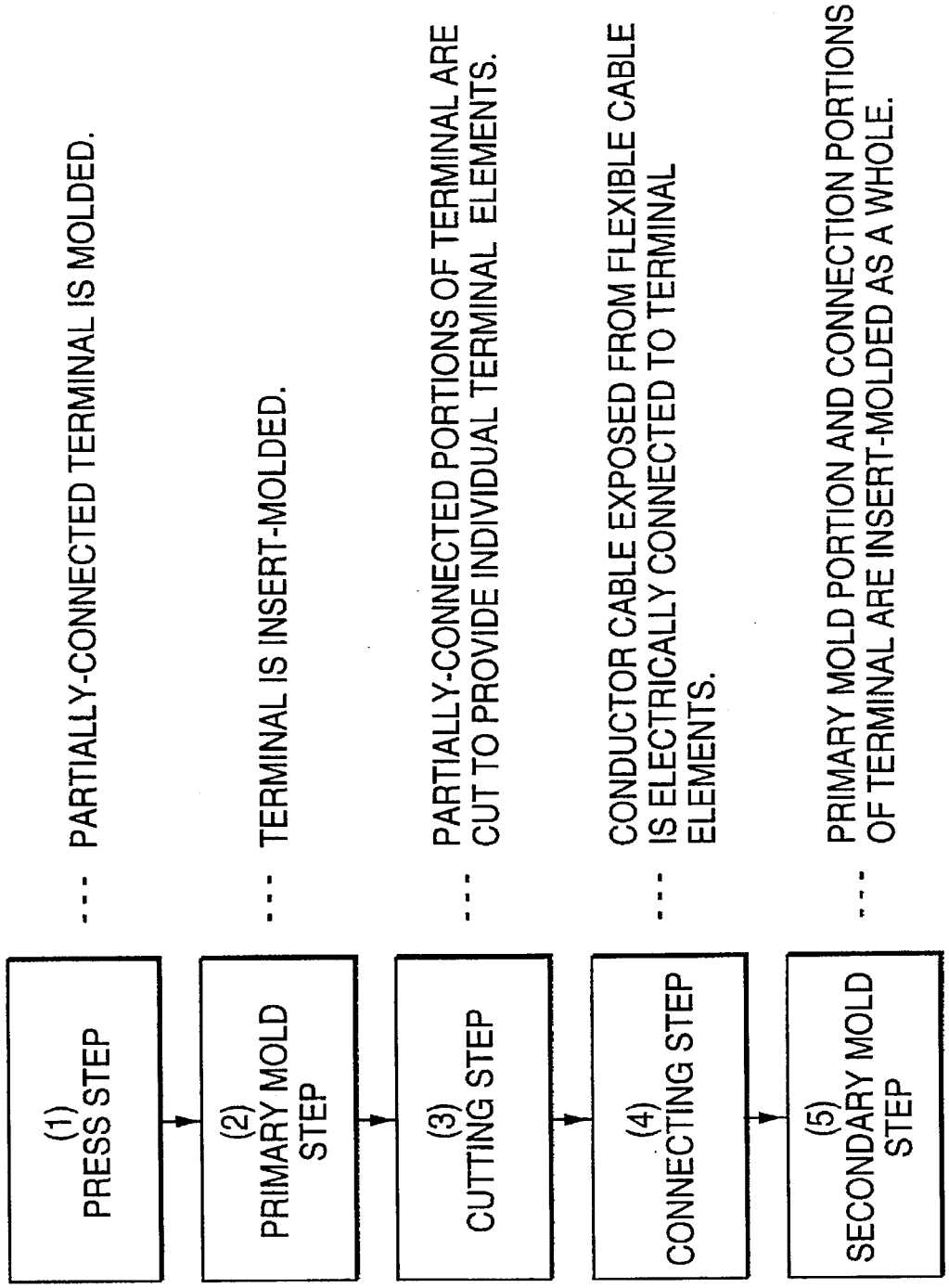
FIG. 14 is a process diagram useful for explaining the production steps according to the prior art.
Figure 15:
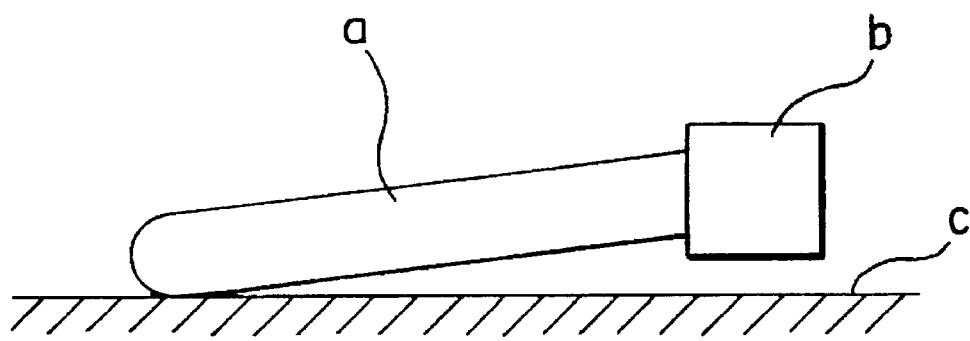
FIG. 15 is an explanatory view showing a fitting state of a elastic tongue according to the prior art.

The present invention is not particularly limited to the embodiments described above. For example, the full width of the elastic tongue 8 on the fitting side to the supports 5A, 5B need not necessarily be reduced, but the width W3 of only its part may be reduced as shown in FIG. 13.

In the present invention, it is necessary that the terminal has the stress concentration portion and the connection plates can be bent and removed by hand, etc., at this stress concentration portion. Therefore, the present invention is not necessarily limited to the embodiments given above, and the flexible cable is not particularly limited to the flat cable, either. Accordingly, various changes and modifications can be made in the present invention.

Due to the construction described above, the present invention provides the following functions and effects.

(1) The structural portion for fixing the end portion of the flexible cable to the housing, that is, the junction member for electrically connecting the flexible cable to the external harness, the direct plug-in connector, etc., formed by the supports, can be molded by one molding step. Therefore, the production step can be simplified and the production cost becomes low.

(2) The partially-connected terminals can be separated into terminal elements through the simple manual operation of merely bending one or more times the connecting plates after the molding step. Therefore, a press mold for separating to terminal elements is not necessary.

(3) Even when the spacing between the terminal elements is small, they can be separated into the individual terminal elements by the manual operation. Therefore, a high level of cutting accuracy is not required and the press mold for separating the terminal elements is not necessary, either. Therefore, the problem of durability of the mold can be solved.

Because of the structural functions described above, the present invention provides the following effects.

Rigidity of the elastic tongue in the transverse direction is partially lowered. Therefore, flexibility to the stress applied in the transverse direction of the elastic tongue occurs. Accordingly, even if the elastic tongue and the flexible cable come into contact with the inner walls of the housings due to a deviation from the tolerance of assembly, they do not come into strong contact, so that the noise resulting from the interference between the elastic tongue and the housing is reduced when the rotary connector device rotates, and durability can be improved.

What is claimed is:

1. A rotary connector device comprising:

a stator housing (1);

a rotor housing (2) rotatably mounted to said stator housing (1);

a flexible cable (3) spirally accommodated in a space defined between said stator housing (1) and said rotor housing (2);

a terminal (4A) electrically connected to exposed conductors (31) of said flexible cable (3); and a support (5A) resin-molded around said terminal (4A), and fixedly mounted to at least one of said stator housing (1) and said rotor housing (2);

wherein said terminal (4A) has electrically opposed ends each of which has stress concentration portions (41A, (41A') on which a stress is concentrated when an external force is applied to said terminal (4A), said terminal (4A) being adapted to be bent at said stress concentration portions (41A, 41A') to be separated at said stress concentration portions (41A, 41A') when said stress is concentrated thereon; and wherein said terminal (4A) includes a plurality of terminal elements (42A) and two connecting elements (43A, 43A') provided at each of said electrically opposed ends, and said connecting elements electrically connecting said terminal elements (42A) together, and said terminal elements (42A) being continuous with said connecting elements (43A, 43A') via said stress concentration portions (41A, 41A').

2. The rotary connector device according to claim 1, wherein each of said connecting elements (43A, 43A') and each of said stress concentration portions (41A, 41A') projects outwardly from a wall of said support (5A), and each of said connecting elements (43A, 43') is bent so that said connecting elements come apart from said support (5A) at said stress concentration portions (41A, 41A').

3. The rotary connector device according to claim 1, wherein each of said stress concentration portions (41A, 41A') includes substantially straight and parallel grooves oppositely formed in opposed surfaces of said terminal elements (42A).

4. The rotary connector according to claim 2, wherein each of said exposed terminal elements (42A) of said support (5A) is connected by ultrasonic welding to a corresponding conductor (71) of a wire harness (7) for connecting with an external circuit.

* * * * *